(12) United States Patent
Li et al.

(10) Patent No.: US 6,298,288 B1
(45) Date of Patent: Oct. 2, 2001

(54) AUTONOMOUS GYRO SCALE FACTOR AND MISALIGNMENT CALIBRATION

(75) Inventors: Rongsheng Li, Hacienda Heights; Yeong-Wei A. Wu, Rancho Palos Verdes, both of CA (US); Garry Didinsky, Niles, IL (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/212,454

(22) Filed: Dec. 16, 1998

(51) Int. Cl.[7] ................................. G06F 7/70; B64G 1/24
(52) U.S. Cl. .......................... 701/13; 244/164; 244/165; 244/171; 250/330; 701/10; 340/973; 340/974
(58) Field of Search ..................... 701/13, 8, 3; 244/165; 250/330

(56) References Cited

U.S. PATENT DOCUMENTS

| | | | |
|---|---|---|---|
| 5,109,346 | * 4/1992 | Wertz | 364/459 |
| 5,259,577 | * 11/1993 | Achkar et al. | 244/164 |
| 5,348,255 | * 9/1994 | Abreu | 244/171 |
| 5,452,869 | * 9/1995 | Basuthakur et al. | 244/164 |
| 6,047,226 | * 4/2000 | Wu et al. | 701/13 |

* cited by examiner

Primary Examiner—William A. Cuchlinski, Jr.
Assistant Examiner—Tuan C To
(74) Attorney, Agent, or Firm—Terje Gudmestad

(57) ABSTRACT

A system and method of estimating the attitude of a spacecraft is disclosed. A three-axis inertial-based estimate of spacecraft attitude is produced and is compared to a stellar-based estimate of spacecraft attitude. A Kalman filter having states associated with gyro scale factor and/or misalignment errors compares the stellar-based attitude estimate to the inertial-based estimate of attitude and apportions the total error into three time varying matrices. A first time varying matrix is associated with gyro scale factor and misalignment errors, a second time varying matrix is associated with gyro bias errors, and a third time varying matrix is associated with attitude errors. The time varying matrices are applied as corrective feedbacks to the inertial-based estimate of spacecraft attitude and are adaptively adjusted to minimize the error therein.

15 Claims, 3 Drawing Sheets

AUTONOMOUS GYRO SCALE FACTOR AND MISALIGNMENT CALIBRATION

BACKGROUND OF THE INVENTION (a) Field of the Invention

The present invention relates generally to spacecraft or satellite attitude determination systems and, more particularly, to a method and apparatus for correcting gyro scale factor and misalignment errors to improve attitude determination performance.

(b) Description of Related Art

The term attitude is used to describe the orientation of an object with respect to a reference orientation. Attitude is of particular interest in satellite or spacecraft operations. For example, if a satellite is used in a communications application, it is necessary that the satellite be oriented in the proper direction to receive and/or transmit relevant information for the communication link.

The attitude of a satellite is determined by computations based on the output of sensors located on the satellite. Gyros and object trackers (such as star trackers, sun sensors, and earth sensors) are two types of sensors that may be used in attitude determination systems. In general, gyros are used to measure the rate at which the spacecraft is moving. By integrating gyro output, spacecraft attitude may be determined. The use of gyros in conjunction with star trackers is commonly known in the art as a stellar-inertial attitude determination system.

Object trackers such as star trackers, earth sensors, or sun sensors are used to determine the orientation or attitude of the satellite with respect to the objects being tracked. Object trackers commonly use a CCD array to measure heat or light emitted from the tracked object. Typically, satellites use an ephemeris system to determine the location of the objects being tracked with respect to the earth. An ephemeris system uses a table containing the coordinates of a celestial body at a number of specific times during a given period. Using ephemeris techniques and object trackers, spacecraft attitude with respect to the earth can be determined.

The use of gyros in an attitude determination system results in attitude errors induced by gyro scale factor and misalignment errors (GSFME). These errors appear as gyro bias errors for non-dynamic spacecraft missions such as an orbit-normal steered spacecraft orbiting in a circular orbit. In non-dynamic missions, the angular accelerations of the spacecraft about its axes are relatively small. Thus, bias errors in non-dynamic missions can easily be estimated and compensated for in the spacecraft's attitude determination system by using a standard six state stellar/inertial Kalman filter, which is well known in the art. Therefore, GSFME has not typically been of much concern because most spacecraft missions were historically not dynamic.

However, spacecraft use has expanded to dynamic missions such as sunnadir steering, perigee passing for highly elliptical orbit (HEO), and dynamic target tracking. In dynamic missions, the angular accelerations of the spacecraft about its axes are relatively large. Thus, GSFME in dynamic spacecraft missions can contribute significantly to spacecraft attitude error. Moreover, in dynamic missions, GSFMEs do not manifest themselves as bias and, therefore, cannot be easily eliminated using a six-state Kalman filter.

Accordingly, there is a need for a method and apparatus that eliminates gyro misalignment and bias errors in dynamic spacecraft missions.

SUMMARY OF THE INVENTION

The present invention provides a method and apparatus for eliminating gyro misalignment and scale factor errors in dynamic spacecraft missions. The invention may be embodied in an attitude control/measurement system for estimating the attitude of a spacecraft. The system has three inertial sensors and a stellar position sensor all coupled to a digital filter. The digital filter receives estimated attitude information from the stellar position sensor and compares it with attitude information derived from the inertial sensors. The filter produces corrective data signals representing misalignment errors between the inertial sensors and/or the scale factor errors of each inertial sensor. The system corrects the inertially derived attitude estimate using the corrective data signals.

In accordance with another aspect of the present invention, a method of estimating the attitude of a spacecraft includes the steps of receiving inertial information from three inertial sensors, correcting the inertial information for scale factor and/or misalignment errors using a first time varying gain matrix, propagating a three axis attitude using the corrected inertial information, and correcting the propagated attitude estimate for attitude errors using a second time varying gain matrix. The first and second time varying matrices are supplied by a digital filter.

The invention itself, together with further objects and attendant advantages, will best be understood by reference to the following detailed description, taken in conjunction with the accompanying drawings.

DESCRIPTION OF THE PREFERRED EMBODIMENTS

Conventional attitude determination systems may generate an attitude error estimate by comparing an inertial-based attitude derived from gyros and a stellar-based attitude derived from star-trackers. Typically, a six-state Kalman filter, using processing algorithms that are well known to those skilled in the art, apportions the total estimated attitude error to gyro bias errors and attitude errors. The six states of the Kalman filter correspond to three gyro bias errors (i.e., one for each gyro) and three attitude errors (i.e., one for each of three orthogonal axes). By apportioning the total attitude error into six categories or sources of error, these conventional systems can apply appropriate corrective feedbacks to improve the accuracy of the final attitude output signal. Portions of the total error actually arising from sources that are not included in the six conventional error categories, for example, gyro bias and attitude errors, will be incorrectly attributed to one of the six categories, thereby degrading the accuracy of the final attitude output.

Conventional attitude determination systems include many of the basic hardware and processing blocks that will be discussed in connection with an attitude determination system 10 (shown in FIG. 1), which embodies aspects of the present invention. Although many of the basic functions shown in FIG. 1 are well known to those skilled in the art, the attitude determination system 10 includes novel functionality that is not found in conventional attitude determination systems.

Figure 1:
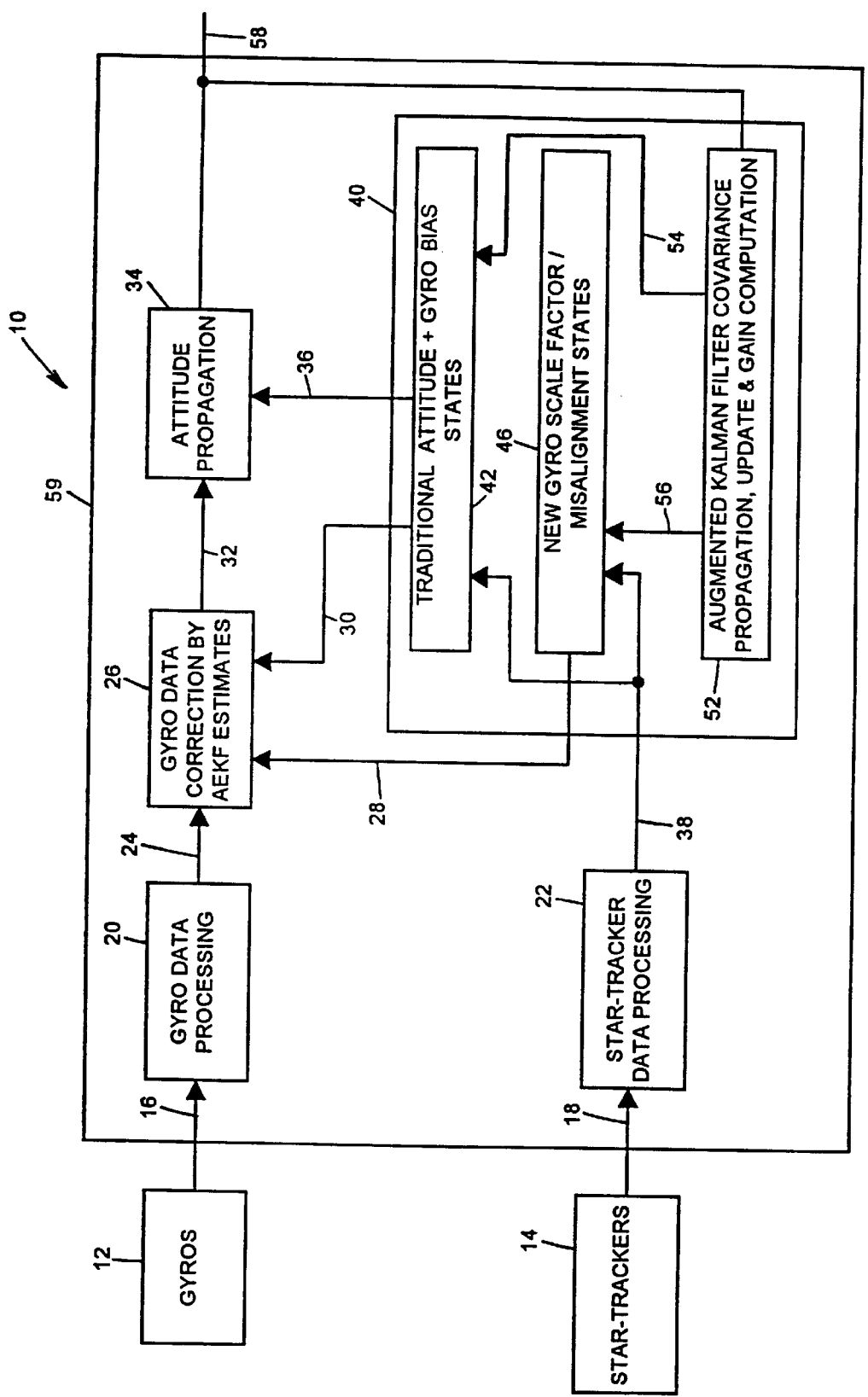
FIG. 1 is a block diagram of an attitude control system embodying aspects of the present invention.

The embodiment of the present invention shown in FIG. 1 augments a standard six-state Kalman filter to include nine additional filter states, for a total of fifteen states. The nine additional states include three states representing gyro scale factor errors and six states representing gyro misalignment errors. As a result, the attitude determination system 10 can generate corrective feedbacks for gyro scale factor and misalignment errors, which are not corrected for in conventional systems. By modifying the Kalman filtering process to include these nine additional gyro scale factor and misalignment states, the attitude determination system 10 apportions total attitude error into a more inclusive group of actual error sources (i.e., scale factor, misalignment, bias, and attitude). Thus, the present invention can greatly improve the determination of a spacecraft attitude, particularly in dynamic spacecraft applications where the gyro scale factor and misalignment errors could significantly degrade the accuracy of the final attitude output.

The attitude determination system 10 is preferably implemented on board a spacecraft (not shown) and includes a gyros sub-system 12, a star-tracker sub-system 14, and a processing/control sub-system 59. The processing/control sub-system 59 receives inputs from the gyros 12 and the star-trackers 14, processes these inputs in accordance with the present invention, and provides corrected attitude control data 58 that preferably represents the attitude of the spacecraft.

In operation, the control flow through the various sub-systems and process blocks of the attitude determination system 10 may be subdivided into a foreground process and a background process. The foreground process includes the collection, processing, and correction of inertially derived measurements and the propagation and correction of spacecraft attitude data. The background process includes the collection of star position data, the comparison of star position data to the inertially based estimate of spacecraft attitude, and the subsequent apportionment of total error (i.e., the difference between the inertially derived attitude and the star position based attitude) among the aforementioned error terms that are used to control/correct the spacecraft's attitude.

The processing/control sub-system 59 may be implemented using a specially programed general purpose microprocessor, or may be implemented using an ASIC, or some combination of software and hardware. Although the present invention may be implemented using various combinations of hardware and software, in the preferred embodiment the processing/control sub-system 59 is implemented using real-time software executed by a general purpose microprocessor.

The gyros sub-system 12 preferably includes at least three gyros that each correspond to one of three mutually orthogonal axes, for example, the pitch, roll, and yaw axes of the spacecraft. The gyros 12 produce a plurality of output signals 16 that are provided to the processing/control sub-system 59. The gyro output signals 16 represent inertial data with respect to the three orthogonal axes and may each contain bias or offset errors, multiplicative or scale errors, and misalignment errors. Bias errors add offsets to the gyro measurements and are typically slow changing. Scale errors (i.e., gyro scale factor errors) vary with the magnitude of the gyro outputs and may be constant or may vary slowly over time. Misalignment errors (i.e., gyro misalignment errors) result from non-orthogonality of the gyro axes. The non-orthogonality for each gyro axis is preferably characterized by the system 10 using two variables representative of the misalignment of one gyro with respect to the other two gyros. For example, the non-orthogonality of a first gyro axis would be fully described by one variable representing the misalignment between the first gyro axis and a second gyro axis, and another variable representing the misalignment between the first gyro axis and a third gyro axis.

The star-tracker sub-system 14 provides star position data 18 using known techniques. For example, the star trackers 14 may be embodied in digital cameras based on charge coupled devices (CCD). The star position data 18 may be represented in vector form using H(i), V(i) for the horizontal and vertical grid locations of a star (i) within the star trackers 14 field of view. The star position data 18 typically includes temporal noise errors and fixed pattern errors that change with star position within the star-trackers 14 field of view.

The processing/control sub-system 59 further includes a gyro data processing block 20, a gyro data correction block 26, a star-tracker data processing block 22, an augmented extended Kalman filter block 40, and an attitude propagation block 34, all of which communicate as shown in FIG. 1.

The gyro data processing block 20 receives the output signals 16 from the gyro sub-system 12 and processes them in accordance with the specific gyro hardware using known techniques. For example, gyro hardware is commonly available as a modular unit that includes a data port providing digital data representative of gyro angles. The gyro data processing block 20 produces a pre-processed gyro data signal 24 that is provided to the gyro data correction block 26. The pre-processing converts the data to a form that is compatible with subsequent processing blocks. For example, the pre-processing may convert the gyro data to a floating point number.

The gyro data correction block 26 receives the corrected gyro data 24 and represents it as a 3×1 gyro rate vector, denoted for purposes of discussion by $\omega_m$. A gyro rate vector is a rate measurement taken from a rate-measurement gyro, or alternatively, delta or incremental angles taken from a rate-integrating gyro. The gyro rate vector $\omega_m$ is a measured value that typically contains bias, scale factor, and misalignment errors as described above. The correction block 26 additionally receives a gyro bias error estimate 30 and a gyro scale factor/misalignment (SF/MA) error estimate 28 from the Kalman filter block 40. The bias error estimate 30 is represented as a 3×1 vector denoted by b, and the SF/MA error estimate 28 is represented as a 3×3 matrix denoted by S. Within S, the diagonal elements represent scale factor errors and the remaining elements represent misalignment errors. The gyro data correction block 26 produces a corrected gyro rate vector (denoted by $\omega_c$) using the identity matrix I, the bias error estimate b, and the SF/MA error estimate S as shown in Equation 1 below. As Equation 1 shows, the bias errors b are subtracted from the gyro rate vector and the scale factor and misalignment errors S are used to scale the gyro rate vector. Those of ordinary skill in the art will recognize that conventional attitude determination systems do not generate the SF/MA estimate 28 and, therefore, do not use the 3×3 S matrix in correcting (i.e., scaling) the gyro rate vector $\omega_m$. Conventional systems include only the bias error term b when performing corrections on the gyro rate vector $\omega_m$.

$$\omega_c = (I-S)*(\omega_m - b) \qquad \text{(Equation 1)}$$

The corrected gyro rate vector $\omega_c$ is provided as a corrected gyro data signal 32 to the attitude propagation block 34.

The attitude propagation block 34 receives the corrected gyro data 32 and an estimated attitude correction data signal 36 that is provided by the Kalman filter block 40. The attitude correction data signal 36 is well known to those of ordinary skill in the art. In known manners, the attitude propagation block 34 applies the attitude correction data 36 to the corrected gyro data 32 and integrates the resulting corrected data to produce a spacecraft attitude data signal 58. The spacecraft attitude data 58 may be represented as a coordinate transformation matrix such as a directional cosine matrix. As is known, coordinate transformation matrices allow vectors (e.g., gyro rate vectors) to be related between different inertial reference frames (e.g., an earth centered inertial (ECI) frame and a spacecraft body inertial frame).

The star-tracker data processing block 22 receives the star-tracker data 18 and provides corrected star position measurements 38, using well known techniques, to the Kalman filter 40. The star-tracker data processing block 22 corrects the star-tracker data 18 and may, for example, correct aberrations in star position measurements. The star-tracker data processing block 22 further performs a direct match identification of stars using an on-board star catalog (OSC). The processing within the star-tracker data processing block 22 preferably uses star position data processing techniques that are well known to those of ordinary skill in the art.

The Kalman filter block 40 receives the corrected star position data 38 and the spacecraft attitude data 58, and provides the gyro bias error estimate 30, the gyro SF/MA error estimate 28, and the estimated attitude correction data 36 as described above. The Kalman filter block 40 further includes, an augmented Kalman filter (AKF) covariance propagation update/gain computation section 52, a scale factor/misalignment states section 46, and an attitude/traditional bias states section 42.

The AKF covariance propagation block 52 receives the spacecraft attitude data 58 and produces a 6×2 attitude and bias gains matrix 54 denoted by $K_1(k)$ and a 9×2 gyro scale factor/misalignment gain matrix 56 denoted by $K_2(k)$. $K_1(k)$ and $K_2(k)$ are time varying matrices evaluated at time k. The attitude and bias gains matrix 54 $K_1(k)$ and the gyro scale factor/misalignment gain matrix 56 $K_2(k)$ provide time varying coefficients that are adaptively and dynamically adjusted to minimize attitude error in the spacecraft attitude data 58. As described in more detail below, the AKF covariance propagation block 52 generates A, H, Q, and R matrices, and uses these matrices in conjunction with a standard well known Kalman filter algorithms to generate the time varying matrices $K_1(k)$ and $K_2(k)$.

As is known in the art, A, H, Q, and R denote standard parametric matrices for use with Kalman filtering algorithms. As apparent to one of ordinary skill in the art, implementing the augmented fifteen-state Kalman filter of the disclosed embodiment requires similarly augmented A, H, Q, and R matrices that model the nine additional filter states (i.e., GSFMEs), along with the standard six states (i.e., gyro bias and attitude errors). Thus, the augmented A, H, Q, and R matrices model a total of fifteen states. While the present disclosure provides particular augmented A, H, Q & R matrices (equations 2–7), details about the derivation of these matrices have not been provided as such derivations utilize standard mathematical techniques, the implementation of which is well within the capabilities of one of ordinary skill in the relevant art(s) and form no part of the present invention.

Equations 2–7 below disclose particular A, H, Q, and R matrices that are used with the above described embodiment of the present invention. These matrices are input to standard Kalman filtering algorithms, thereby generating corrective feedback signals (28, 30 & 36 shown in FIG. 1) used to improve spacecraft attitude control in accordance with the present invention. Some higher level details about how the matrices A, H, Q, & R are processed using the aforementioned standard Kalman filtering algorithms are provided later in this disclosure. Details beyond those provided herein are not discussed as such details are well within the abilities of those skilled in the relevant art(s) and form no part of the present invention.

The A matrix is represented within the AKF covariance propagation block 52 as shown in Equation 2 below.

$$A(t) = \begin{bmatrix} 0 & C_B^{ECI} & C_1\omega^T & C_2\omega^T & C_3\omega^T \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \quad \text{(Equation 2)}$$

The matrices $C_1$, $C_2$, and $C_3$ are also developed within the AKF covariance propagation block 52 by partitioning the matrix $C_B^{ECI}$ in accordance with Equation 3 below.

$$C_B^{ECI} = [C_1 | C_2 | C_3] \quad \text{(Equation 3)}$$

The matrix $C_B^{ECI}$ is a directional cosine matrix, as is well known in the art, that transforms the coordinates of a vector from the spacecraft body frame to the ECI frame. The H matrix is represented within the AKF covariance propagation block 52 as shown in Equation 4 below.

$$H = [H_1 \quad 0_{2\times 3} \quad 0_{2\times 3} \quad 0_{2\times 3} \quad 0_{2\times 3}] \begin{bmatrix} \delta\theta \\ b \\ S_1 \\ S_2 \\ S_3 \end{bmatrix} \quad \text{(Equation 4)}$$

where $S = [S_1 | S_2 | S_3]^T$.

The matrix $H_1$ is given by Equation 5 below.

$$H_1 = \begin{vmatrix} \frac{r_{ST}(2)}{r_{ST}(3)} & 0 & -\frac{r_{ST}(1)}{r_{ST}^2(3)} \\ 0 & \frac{r_{ST}(1)}{r_{ST}(3)} & -\frac{r_{ST}(2)}{r_{ST}^2(3)} \end{vmatrix} C_B^{ST} C_{ECI}^B [r_{ECI} \times] \quad \text{(Equation 5)}$$

The vector $r_{ST}$ and $r_{ECI}$ are estimated star position unit vectors in the star tracker (ST) frame and the earth centered inertial (ECI) frame respectively. The notation $[r_{ECI} \times]$ is a skew symmetric matrix such that pre-multiplication by this matrix is equivalent to pre-cross-multiplication by the vector $r_{ECI}$. The matrix $C_B^{ST}$ is a directional cosine matrix that transforms the coordinates of a vector from the spacecraft body frame to the star tracker frame.

The Q matrix is represented in the AKF covariance propagation using Equation 6 below.

$$Q = \text{Block diag}(C_B^{ECI} Q_{ARW} C_B^{ECI\,T}, Q_{RRW}, Q_{SRW})^{\Delta t} \quad \text{(Equation 6)}$$

The matrices $Q_{ARW}$, $Q_{RRW}$, and $Q_{SRW}$ are covariance matrices of the gyro angle random walk, gyro rate random walk, and the gyro scale factor and misalignment random walk respectively.

The R matrix is represented in the AKF covariance propagation block 52 using Equation 7 below.

$$R = \text{diag}(\sigma_H^2, \sigma_V^2) \quad \text{(Equation 7)}$$

The R matrix represents the measurement covariance matrix for the star position measurement of interest.

Using the A, H, Q, and R matrices determined using Equations 2 through 7 above, the AKF covariance propagation block 52 implements a known Kalman filter algorithm to produce a 15×2 gain matrix K. The gain matrix K is further partitioned using known techniques into the 6×2 attitude and bias gains matrix 54 $K_1(k)$ and the 9×2 gyro scale factor/misalignment gain matrix 56 $K_2(k)$ discussed above.

The traditional attitude and gyro bias states section 42 receives the $K_1(k)$ matrix 54 data and the corrected star position data 38 denoted by ŷ. The traditional attitude and gyro bias states section 42 compares the corrected star position data 38 to the a predicted star position (denoted as y) and apportions the total error y−ŷ into attitude $\delta\theta(k)$ and gyro bias errors $\delta b(k)$ using Equations 8 and 9 below in sequence.

$$X_1(k) = \begin{bmatrix} \delta\theta(k) \\ \delta b(k) \end{bmatrix} = K_1(k)(y - \hat{y}) \qquad \text{(Equation 8)}$$

$$b(k) = b(k-1) + \delta b(k) \qquad \text{(Equation 9)}$$

The gyro SF/MA section 46 receives the $K_2(k)$ matrix data 56 and the corrected star position data 38 denoted by y. The gyro SF/MA states section 46 compares the corrected star position data 38 to the a predicted star position (denoted as ŷ) and divides the total error y−ŷ into attitude scale factor and misalignment errors (i.e., matrix S(k)) using Equations 10 and 11 below in sequence.

$$X_2(k) = \begin{bmatrix} \delta S_1(k) \\ \delta S_2(k) \\ \delta S_3(k) \end{bmatrix} = K_2(k)(y - \hat{y}) \qquad \text{(Equation 10)}$$

$$S(k) = S(k-1) + [\delta S_1(k), \delta S_2(k), \delta S_3(k)]^T \qquad \text{(Equation 11)}$$

The above described attitude determination system 10 compares the spacecraft attitude derived from gyros (i.e., inertial data) to the spacecraft attitude determined by startrackers. The resulting error estimate is attributed to attitude and gyro bias errors, gyro scale factor errors, and gyro misalignment. The error estimate is apportioned into the corresponding error terms according to the adaptive, time varying matrices $K_1(k)$ and $K_2(k)$ developed in the Kalman filter 40. These error terms are further used to provide corrective feedback to the attitude determination system 10 via the gyro data correction block 26.

In operation, the control flow through the various subsystems and process blocks of the present invention may be sub-divided into a foreground process and a background process. The foreground process includes the collection, processing, and correction of inertially derived measurements and the propagation and correction of spacecraft attitude data. Namely, the gyros sub-system 12, the gyro data processing block 20, the gyro data correction block 26, and the attitude propagation block 34 together with the gyro SF/MA error estimate 28, the gyro bias error estimate 30, and the estimated attitude correction data signal 36 provide an inertially derived spacecraft attitude 58. The background process includes the collection of star position data (i.e. blocks 14 and 22), the comparison of star position data to the inertially based estimate of spacecraft attitude, and the subsequent apportionment of total error (i.e. difference between the inertially derived attitude and the star position based attitude) to SF/MA, bias, and attitude errors (i.e., within the Kalman filter block 40).

The foreground and the background processes are essentially independent but are linked through an exchange of data. The foreground process provides an inertial-based attitude measurement 58 to the background process. The background process uses this inertial-based attitude measurement along with an attitude measurement based on star positions to provide the foreground process with correction parameters (i.e., SF/MA, bias, and attitude). Thus, the background process provides the foreground process with multiple corrective feedbacks that are adaptively varied, and that are ultimately referenced to absolute star positions.

The foreground and background processes do not have to execute at the same rate. In the preferred embodiment, the execution rates of the two processes may be optimized to achieve the desired dynamic control characteristics at the lowest cost. For example, the dynamic spacecraft control needed may require the foreground process to execute at a rate of 10 Hz. To make economical use of available processing power the background process may be executed at a much slower rate (e.g. 0.5 Hz).

Figure 2:
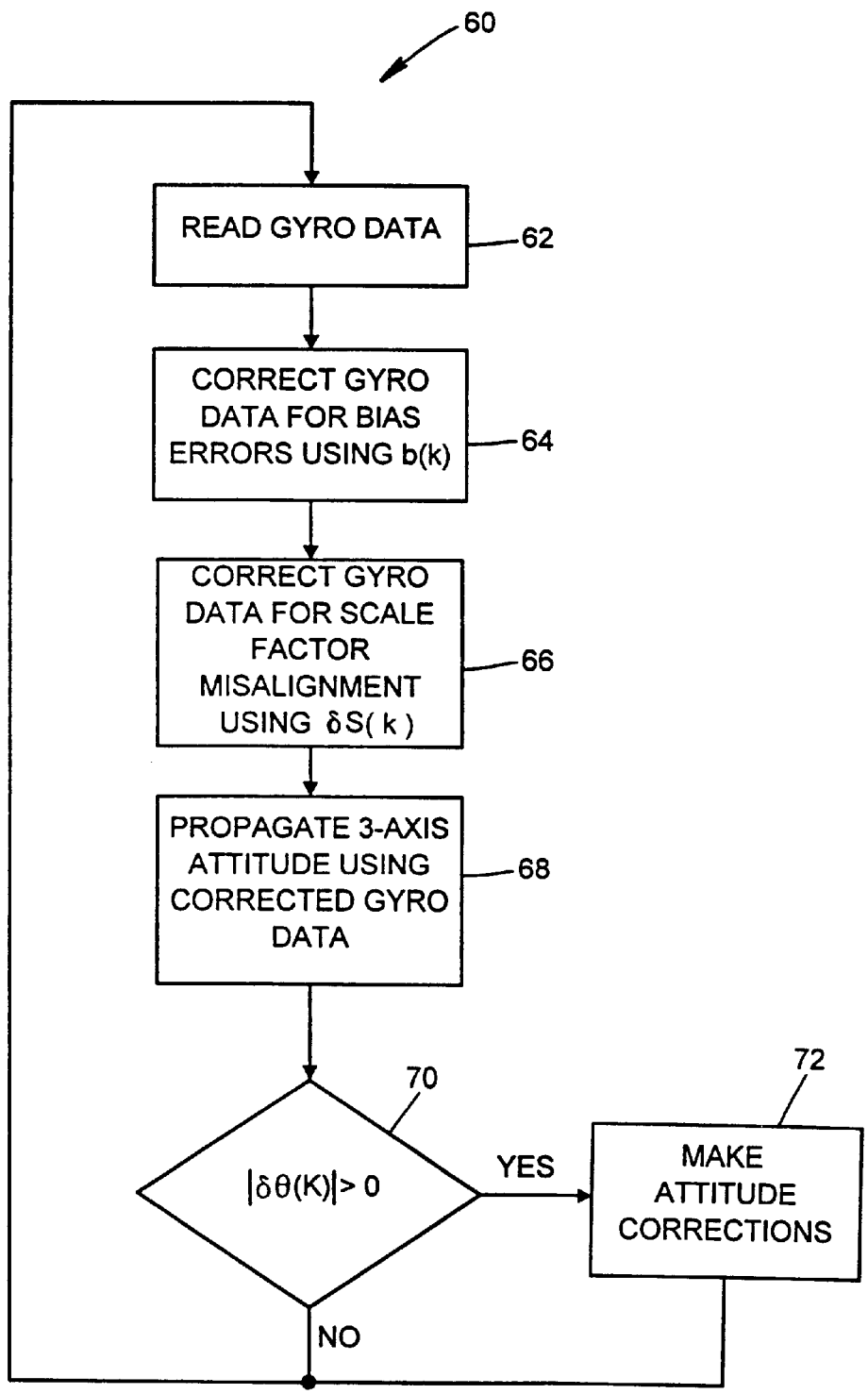
FIG. 2 is a flowchart depicting the foreground control process of the present invention.

Illustrated in FIG. 2 is a flowchart depicting in more detail the control flow of the foreground process 60 of the present invention. In a first block 62 the gyro data is acquired. A second block 64 uses the time varying matrix b(k) to correct the gyro data for bias errors. A third block 66 uses the time varying matrix S(k) to correct the gyro data for scale factor and misalignment errors. A fourth block 68 propagates (i.e., integrates) the gyro data that has been corrected for bias, scale factor, and misalignment errors. A fifth block 70 determines if the attitude errors are non-zero. If the attitude errors are non-zero, a sixth block 72 makes the necessary corrections to the attitude data. If there are no attitude errors or after leaving the sixth block 72 the process 60 repeats itself beginning at the first block 62.

Figure 3:
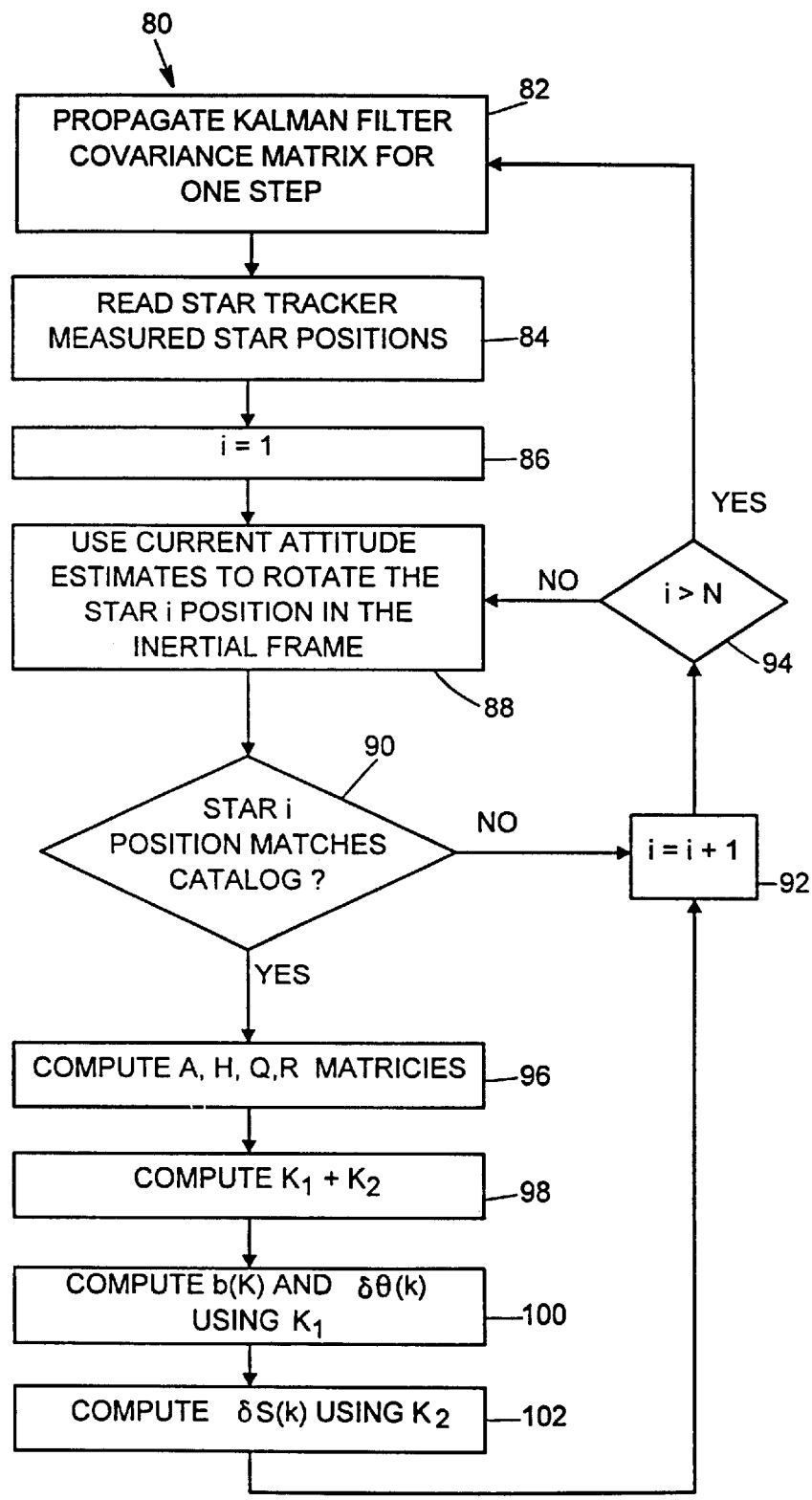
FIG. 3 is a flowchart depicting the background control process of the present invention.

Illustrated in FIG. 3 is a flowchart depicting in more detail the control flow of the background process 80 of the present invention. A first block 82 propagates, using known techniques, the Kalman filter covariance matrix for one step. A second block 84 acquires the star positions from the star tracker. A third block 86 initializes a star counter to one. A fourth block 88 uses the current attitude estimate to rotate the current star position (i.e., star i) in the inertial frame. A fifth block 90 determines if the current star position matches the on-board star catalog. If the current position of star i matches the star catalog, a sixth block 96 computes the A, H, Q, and R matrices as described in detail above, a seventh block 98 computes the time varying matrices $K_1(k)$ and $K_2(k)$, an eighth block 100 uses $K_1(k)$ to compute b(k) and $\delta\theta(k)$, and a ninth block 102 computes S(k) using $K_2(k)$. Following the ninth block 102, or if the fifth block 90 determines that the current star i's position does not match the on-board star catalog, a tenth block 92 increments the star counter to the next star. An eleventh step 94 checks if all stars (N) have been processed. If there are more stars to process the process 80 reenters the fourth step 88. If all stars have been processed the process 80 repeats by reentering the first block 82.

The foreground process 60 and the background process 80 can execute substantially independent of each other. Furthermore, these two processes can execute at different rates to optimize dynamic performance (i.e. the foreground process) and to minimize costs (i.e. reducing the processing burden imposed by the more complex background process).

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A system for estimating the attitude of a spacecraft comprising:
   first, second, and third inertial sensors;
   a stellar position sensor;
   a digital filter;
   the filter adapted to receive a first estimated spacecraft attitude derived from the stellar position sensor and a second estimated spacecraft attitude derived from the first, second, and third inertial sensors;
   the filter further adapted to compare the first and second estimated attitudes to produce corrective data signals that are representative of the misalignment between the inertial sensors and the scale errors associated with each of the three inertial sensors; and
   a means for correcting the second estimated spacecraft attitude using the corrective data signals.

2. The system of claim 1, wherein the first, second, and third inertial sensors are uniquely associated with substantially orthogonal axes.

3. The system of claim 1, wherein the digital filter adjusts its filtering coefficients to minimize error in the inertially estimated attitude.

4. The system of claim 3, wherein the digital filter is a Kalman filter.

5. The system of claim 3, wherein the digital filter is a Kalman filter having fifteen states.

6. The system of claim 1, wherein the digital filter produces corrective data signals representative of gyro bias errors.

7. The system of claim 1, wherein the digital filter produces corrective data signals representative of attitude errors.

8. A method of estimating the attitude of a spacecraft, the method comprising the steps of:
   receiving inertial information from three inertial sensors;
   correcting the inertial information using a first time varying matrix having corrective data associated with scale factor and misalignment errors in the inertial information computed by a digital filter;
   propagating a three axis attitude using the corrected inertial information to produce a propagated attitude estimate; and
   correcting the propagated attitude estimate for attitude errors to produce a final output attitude estimate, the correction being made using a second time varying matrix computed by the digital filter.

9. The method of claim 8, wherein the steps of generating, correcting, propagating, and correcting are executed more than once.

10. The method of claim 8, further including the step of correcting the inertial information for sensor bias errors.

11. The method of claim 8, wherein the digital filter compares measured star positions to the final output attitude estimate and based on the comparison produces the first and second time varying matrices.

12. The method of claim 11, wherein the first and second time varying matrices are produced using a Kalman filter.

13. A system for estimating the attitude of a spacecraft comprising:
   a first sensor that acquires three axis inertial data;
   a second sensor that acquires star position data;
   a first processor that processes the three axis inertial data to produce a first estimate of spacecraft attitude;
   a second processor that processes the star position data to produce a second estimate of spacecraft attitude;
   a digital filter that compares the first and second estimates of spacecraft attitude, and therefrom produces at least a first time varying matrix having corrective data associated with scale factor and misalignment errors in the three axis inertial data; and
   the first processor further adapted to apply the corrective data to the first estimate of spacecraft attitude.

14. The system of claim 13, wherein the digital filter produces a second time varying matrix comprising corrective data associated with bias errors in the three axis inertial data.

15. The system of claim 13, wherein the digital filter produces a third time varying matrix comprising corrective data associated with attitude errors in the three axis inertial data.

* * * * *